(12) United States Patent
James

(10) Patent No.: US 7,287,551 B2
(45) Date of Patent: Oct. 30, 2007

(54) GAS CONTROL VALVE

(75) Inventor: Dale Peter James, Frankston (AU)

(73) Assignee: Advanced Products Pty, Ltd., Victoria (AU)

( * ) Notice: Subject to any disclaimer, the term of this patent is extended or adjusted under 35 U.S.C. 154(b) by 0 days.

(21) Appl. No.: 11/354,157

(22) Filed: Feb. 15, 2006

(65) Prior Publication Data

US 2006/0130906 A1    Jun. 22, 2006

Related U.S. Application Data

(63) Continuation of application No. 10/989,421, filed on Nov. 17, 2004, now abandoned, which is a continuation of application No. PCT/AU03/00595, filed on May 16, 2003.

(30) Foreign Application Priority Data

May 17, 2002    (AU)    .................................... PS2382

(51) Int. Cl.
*F16K 11/14*    (2006.01)
*F16K 5/04*    (2006.01)
*F16K 31/524*    (2006.01)

(52) U.S. Cl. .................... 137/629; 137/636.4; 251/256

(58) Field of Classification Search ................ 137/629, 137/636.4, 65, 66, 599.16, 599.17, 601.12, 137/601.14, 601.15; 251/96, 251–259, 129.11
See application file for complete search history.

(56) References Cited

U.S. PATENT DOCUMENTS 1,436,650 A    11/1922    Gilbert 2,335,519 A    11/1943    Lamar (Continued)

FOREIGN PATENT DOCUMENTS

| FR | 903 494 A | 10/1945 |
| GB | 1 371 578 A | 10/1974 |
| GB | 2 088 021 A | 6/1982 |
| GB | 2 162 446 A | 2/1986 |

(Continued)

OTHER PUBLICATIONS

Derwent Abstract Accession No. 96-382979/38, Class Q66, RU 2049946-C1 (NIIPA Res Prodn. Assoc.), Dec. 10, 1995.
Derwent Abstract Accession No. 2002-628583/68, Class, Q66, CN 1187597A (CHANG), Jul. 15, 1998.

*Primary Examiner*—Stephen M. Hepperle
(74) *Attorney, Agent, or Firm*—Oliff & Berridge, PLC (57) ABSTRACT

The present invention provides gas control valve including a valve body having a gas inlet, a gas outlet, and a gas passage between the inlet and outlet, and including a valve control element for controlling the flow of gas between the inlet and the outlet. The valve control element includes valve stem have a cam follower in the form of a pin projecting laterally there-from, and a bead 8 at one end of the stem bearing an O-ring that is able to seal against an inside wall surface of the body to seal the gas outlet. The cam follower pin on the stem engages with a cam surface of the valve body. Rotation of the valve control element causes the cam follower pin to co-operate with the cam surface and displace the valve control element to open or close the valve. The present invention also provides a gas appliance having one or more gas burners and a gas control including at least one control value according to the invention.

25 Claims, 5 Drawing Sheets

U.S. PATENT DOCUMENTS

| | | |
|---|---|---|
| 2,987,078 A | 6/1961 | Du Perow |
| 3,244,198 A | 4/1966 | Larkin |
| 3,280,844 A | 10/1966 | Frank et al. |
| 3,292,660 A | 12/1966 | Zarybnicky |
| 4,029,291 A | 6/1977 | Carlson |
| 4,640,678 A * | 2/1987 | Fraioli .......................... 431/75 |
| 5,011,043 A * | 4/1991 | Whigham et al. ............ 222/63 |
| 5,241,463 A * | 8/1993 | Lee ............................. 700/90 |
| 6,443,135 B1 * | 9/2002 | Dismon et al. ......... 123/568.18 |
| 6,534,793 B1 * | 3/2003 | Heritier-Best ................ 257/77 |

FOREIGN PATENT DOCUMENTS

| | | |
|---|---|---|
| JP | A-57-101184 | 6/1982 |
| WO | WO 01/11278 A1 | 2/2001 |
| WO | WO 02/06731 A1 | 1/2002 |

* cited by examiner

GAS CONTROL VALVE

This is a Continuation of U.S. patent application Ser. No. 10/989,421, filed Nov. 17, 2004 now abandoned, which is, in turn, a Continuation of International Application No. PCT/AU03/00595, filed May 16, 2003. The entire disclosures of the prior applications are incorporated by reference.

TECHNICAL FIELD

The present invention relates generally to a valve for the control of gas flow. More particularly, although not exclusively, the present invention relates to a valve for controlling the flow/supply of fuel gas to a gas burner. The present invention also relates to an appliance incorporating such a valve.

BACKGROUND ART

Gas-fuelled appliances, such as barbecues, stoves, cookers, cooker tops and the like, typically include a plurality of burners, a tubular manifold or ran through which the gas fuel is supplied to the burners, and a gas valve between the manifold and each of the burners in order to individually regulate the supply of gas to the burners.

These gas valves are generally based on the same basic "plug valve/gas cock" design, which is widely accepted throughout the industry and is the industry standard.

That design comprises a valve body having a tapered cavity with a gas outlet at its base and a gas inlet on the tapered sidewall. A plug of complementary taper is rotatably mounted within the cavity, and includes a gas passage between an outlet in the bottom of the plug and an inlet on the side of the plug. In use, rotation of the plug causes the plug inlet to overlap with the cavity inlet to a greater or lesser extent, and so regulates the flow of gas through the valve. The plug is rotated using an elongate control key that is engagable with the top end of the plug, and the plug and key are retained in place on the valve body by a cap that also seals the cock, the cap being screwed into place on the valve body. A special lubricant is injected between the plug and cavity sidewall to lubricate the plug movement and also to act as a seal.

The present invention aims to provide an alternative gas control valve to the current standard valve, which, in its various asps and embodiments, may provide a number of advantages.

SUMMARY OF THE INVENTION

Viewed from one aspect the present invention provides a gas control valve including a valve body having a gas inlet, a gas outlet, and a gas passage between the inlet and outlet and a valve control element/key for controlling the flow of gas between the inlet and outlet wherein the valve control element includes one of a cam follower and a cam surface, and the valve body has a complementary other one of the cam follower and cam surface, wherein the cam follower engages with the cam surface, such that rotation of the valve control element cause the cam follower to co-operate with the cam surface to position the valve control element to open or dose the valve.

Most preferably, the valve control element includes a cam follower that engages with a cam surface on the valve body, and rotation of the valve control element causes the cam follower to co-operate with the cam surface to position the valve control element to open or dose the valve.

The valve control element or key may comprise an elongate stem that may be either manually or automatically rotated, and a head on which is located a sealing element, such as one or more resilient ring seals. The cam follower, e.g. a pin, may be mounted on the valve stem, and through following the profile of the cam surface (or being placed on a particular portion of the cam surface) may cause longitudinal movement of the stem to thereby move the head into and out of engagement with a valve seat or other sealing surface of the valve body to open or close the valve.

A valve according to the present invention has a number of advantages. For example, it generally requires fewer manufacturing steps and is easier and less expensive to manufacture than the prior art valve cocks. It uses fewer parts than the prior art valve cocks, as it does not need a separate plug or cap, and does not need the special lubricants of the prior art. In this regard, it may be seen as incorporating the plug and control key of the prior art into a single element.

Also, the prior valve cocks required the plug and valve body to undergo a lapping operation in which the two were ground together until required tolerances were achieved. This is not necessary in the present valve system, which can use a resilient O-ring as a seal.

A point to note is that the prior art valves can have a tendency to stick, so that sometimes a large turning force is required to open them. This is not generally a problem with manual operation of a stove or the like, but can be problematic when electronic (or other automatic control) is required. Thus, in order to use the prior art valves in electronic systems and to ensure that the valves would always be able to be operated by an electric motor, one would need to use large high-torque motors, which might also need to include a gear train or the like to further increase the output torque. This need not be a problem in all cases, e.g. where size is not critical, but the use of large motors can be undesirable, for example in an electronic gas cooker or other such appliances, where space may be at a premium.

Valves in accordance with the present invention, however, do not have this tendency to stack, and so smaller, lower-torque motors can be used to operate them. This opens up a whole new area in for example gas cooker technology and the like, and makes possible the electronic control of the burners of a gas cooker, whilst using compact and low-torque electric motors or other actuators.

The cam surface may take any suitable form/profile in order to provide the appropriate movement to the valve control element. It will generally be oriented in a plane transverse to a longitudinal/axial opening and closing movement of the valve control element.

The cam follower may also take any suitable form, and may be provided at any suitable location on the valve control element. It may comprise a pin mounted on the valve control element e.g. on a stem thereof. One pin is all that is generally required, although the use of two or more pins, e.g. a pair of opposing pins, would also be possible. In this case, two or more identical cam surfaces would be required, e.g. each extending 180 degrees about the periphery of the gas passage.

Preferably, the cam surface includes a ramped portion, such that movement of the cam follower from a lower to a higher position on the ramped portion moves the valve control element from a closed to an open position and vice versa.

The ramped portion may continuously increase in profile height, or could comprise a number of stepped portions of varying heights and lengths. The cam follower may be able to move continually over the cam surface, or may need to be placed at particular positions on the surface, e.g. by pushing the cam follower off of the cam surface, rotating the valve control element to move the cam follower to a new position above the cam surface, and then allowing the cam follower to re-engage the cam surface, e.g. through a spring bias.

The cam surface may allow for throttling of the valve or simple on/off control with only limited or no adjustment in between being possible. Sensitivity and degree of turning of the valve control element for a set valve opening may be controlled by the cam profile.

Preferably, the cam surface includes an "off" recess, such that when the cam follower lies within the recess, rotation of the valve control element is prevented. This can act as a safety feature so as to prevent the accidental operation of the valve, e.g. by a child, and can require the user to firstly push the valve control element inwards into the valve body to move the cam follower out of the "off" recess, before rotating the valve control element to open the valve.

It should be noted that this feature need not necessarily be applied to an electronically controlled gas valve, as the valve actuating mechanism will be generally inaccessible within the body of an associated appliance or device, e.g. an electronic cooker, and so there will be no likelihood of accidental operation. This could also apply to any other type of non-manual actuator, including automatic actuators.

It should also be noted that the valve closure element may be biased against movement into the valve body, e.g. by suitable spring means mounted on the valve stem, and also biased to urge the cam follower against the cam surface.

When the valve control element is able to be moved longitudinally by a user, e.g. to move the cam follower out of the "off" recess or off of the cam surface, the valve may include means to restrict the inwards movement of the valve control element (key) so that the valve itself cannot be opened by this longitudinal movement unless the valve control element has been rotated by a suitable amount, e.g. to a position where the cam follower is over the ramped portion of the cam surface.

This provides a further safety feature that prevents accidental opening of the valve by someone inadvertently moving the valve control element. e.g. through pressing on a control knob of an associated gas cooker.

The restriction means could take any suitable form, e.g. a projection on the valve control element that engages with a raised portion of the valve body when in the "off" position, so that only a limited inward movement of the valve control element is allowed, e.g. sufficient to move the valve control element out of the "off" recess in the cam surface. The projection could for example be provided on a clip of the valve stem that holds the above-mentioned bias spring. Alternatively a projection could be provided on the inside of the valve gas passage, above the cam surface, so as to engage the cam follower and limit its axial movement when the valve control element is in the closed position.

In an especially preferred form, the valve includes a bypass flow path that may provide a constant flow rate, which may be lower than that provided by the main valve seal. This can then be used for example in a simmer control of a cooker hob/cooker-top.

The bypass flow is preferably provided by a gas passage within the valve control element. Thus, the valve control element preferably has a gas passage extending between an opening in one end (e.g. the head end) of the valve control element and an opening in a side portion of the valve control element in order to bypass the main valve seal and provide a constant flow of gas between the valve inlet and outlet. The bypass flow may be activated either by rotational and/or longitudinal movement of the valve control element.

The bypass flow may remain on when the full flame is provided through the main seal.

The cam surface preferably includes a bypass portion that moves/holds the valve control element in a position where gas is able to flow through the bypass passage without opening the main valve seal.

The bypass flow may be provided in any suitable manner. In one preferred embodiment, a gas channel is provided along a length of the main gas passage of the valve body, and a bypass gas flow occurs when a side opening of the valve control element and the gas channel overlap. This overlap may occur through longitudinal movement of the valve control element although it would also be possible to configure the assembly for rotational movement.

Preferably, a seal, such as an O-ring, is provided about the valve control element, and lies between the bypass side opening and the gas channel when the valve control element is in the closed position. Leakage of gas through the bypass passage is therefore prevented.

In an alternative bypass flow control, the valve control element may include a bypass valve in the bypass passage for opening and closing the passage.

This bypass valve may be actuated by the engagement of an actuator of the bypass valve with a portion of the inner surface of the main gas passage of the valve body. This portion may be suitably profiled so as to provide the bypass valve with a suitable opening and closing regime.

Axial and/or rotational movement of the valve control element may cause the actuator to engage the inner surface of the gas passage.

The bypass valve may be provided adjacent the side opening of the valve control element, and the actuator may extend through the side opening into the main gas passage. In a closed position, the actuator may extend into a recess in the main gas passage, so that it remains fully extended and the bypass valve remains closed. This recess may take the form of the main inlet or outlet of the valve body. Movement of the valve control element may then cause the actuator to be moved out of the recess so that it is forced inwardly into the side opening of the valve control element, and so opens the bypass valve.

The bypass valve could also be provided elsewhere in the bypass passage, e.g. as a slide valve arrangement, but this may then require an extra hole in the valve control element and the machining of an extra recess in the valve body.

The recess within which the bypass actuator extends in the closed position may include a ramped portion to facilitate the movement of the actuator out of the recess without catching.

In one preferred form, the bypass flow may be adjustable. This would allow e.g. the setting of a suitable simmer gas flow dependent upon the type of gas fuel used. Thus, natural gas requires a larger simmer orifice than LPG gas.

The bypass flow may be adjusted by varying the size of the bypass inlet opening, outlet opening, or gas passage. For example, the side opening of the bypass passage may be adjusted by a hollow plug having inlet and outlet openings, the plug being mounted in the valve control element adjacent the side opening of the bypass passage, rotation of the plug causing one of the plug's openings to overlap with the bypass side opening to a greater or lesser extent so as to control flow. Alternatively, a needle valve could be provided in the valve closure member, rotation of the needle valve closing or opening the bypass passage as required. The plug or needle valve could, be accessed by a longitudinal passage within the valve control element into which a screwdriver or other suitable tool may be inserted for screwing down the needle valve or rotating the plug.

The main seal of the valve control element may seal against an inner surface or sidewall of the gas passage of the valve body, e.g. at an end thereof over a range of positions of the valve control element, and may only open after the valve control element has traveled a set distance, so that the main seal is moved beyond the sidewall portion, e.g. has moved out of an end of the gas passage. The main seal can then remain dosed over this range as the valve control element is moved longitudinally along the main gas passage, e.g. so as to be placed in a simmer mode.

Alternatively, the valve element may seal against a valve seat that e.g. lies transverse to the direction of motion of the valve element. This has the advantage that as the seal (e.g. O-ring) wears, the valve will remain firmly sealed in the closed position, as any wear in the seal can be taken up by the valve control element lying slightly further within the valve body on closure with the seal resting slightly lower on the valve seat.

The valve control element may further alternatively seal against both a valve seat and an inner surface of the main gas passage.

In a preferred embodiment of the invention, the gas valve is in the form of a thermostat.

As said above, the present invention is also particularly applicable to electronically controlled gas valves, and indeed to automatically controlled gas devices and appliances in general, and the valve preferably includes an automatic actuator, such as an electric actuator (e.g. an electric motor), to move the valve control element. The electric motor could take any suitable form. e.g. a servo or stepper motor.

A micro-switch, trip-switch or other suitable switching means may be provided to sense the position of the valve, e.g. whether or not it is in the "off" position, and may engage with a notch or projection in the valve control element, e.g. in its stem, when the valve is closed.

The possibility of electronic and/or automatic actuation of the valve is in itself an important feature, and, viewed from another aspect, the present invention provides an automatic gas valve, wherein the valve includes a valve body having a gas inlet, a gas outlet, a gas passage between the inlet and outlet, and includes a valve control element for controlling the flow of gas between the inlet and outlet, wherein the valve control element includes a cam follower that engages with a cam surface of the valve body, rotation of the valve control element causing the cam follower to co-operate with the cam surface and position the valve control element to open or close the valve, and wherein the valve control element is controlled by an automatic actuator.

Also, viewed from a further aspect, the present invention provides an electronic gas valve assembly, wherein the assembly includes a valve body having a gas inlet, a gas outlet, and a gas passage between the inlet and outlet, and includes a valve control element for controlling the flow of gas between the inlet and outlet wherein the valve control element includes a cam follower that engages with a cam surface of the valve body, wherein rotation of the valve control element causes the cam follower to co-operate with the cam surface and position the valve control element to open or close the valve, and wherein the assembly includes an electric actuator for controlling the valve control element.

Viewed from a further aspect, the present invention may be seen to provide a gas valve including a cam follower and a cam surface over which the cam follower may be moved in use, movement of me cam follower over the cam surface causing the gas valve to open or close.

Viewed from a still further aspect the present invention provides a gas valve including a camming surface on a body of the valve and a follower on a valve element mounted within the body, rotation of the valve element causing movement of the follower over the camming surface and movement of the valve element in a direction perpendicular to the direction of rotation.

Viewed from another aspect, the present invention provides a gas control valve including a valve body and key, wherein the key includes an O-ring thereon for sealing against the valve body, and wherein the key is moved by a camming mechanism to engage or disengage the bring with the valve body. Preferably, the key includes a bypass passage therein for providing a bypass flow about the O-ring seal.

Viewed from a still further aspect, the present invention provides a gas control valve in which an O-ring seal is opened or dosed by a camming action, and in which a bypass passage is provided in a valve key on which the O-ring is mounted.

The present invention also extends to a gas appliance or device incorporating any one or more of the above-discussed gas control valves.

Thus, the present invention may be viewed as providing a gas appliance including a gas control valve, wherein the valve includes a valve body having a gas inlet, a gas outlet and a gas passage between the inlet and outlet, and includes a valve control element for controlling the flow of gas between the inlet and outlet, and wherein the valve control element includes a cam follower that engages with a cam surface of the valve body, and wherein rotation of the valve control element causes the cam follower to cooperate with the cam surface to position the valve control element to open or close the valve.

Preferably the gas appliance is an automatically and/or electronically controlled gas appliance including an actuator for automatically and/or electrically moving the valve control element.

The gas valve has applications in relation to for example gas barbeques, gas cookers, gas hobs, gas cooker-tops, gas stoves, gas heaters, gas driers, gas water heaters and the like.

The valve may be made from any suitable materials and in any suitable sizes. The main O-ring may for example be made from Viton, nitrile or silicon, whilst the valve body and valve control element may be made from aluminium and/or brass.

BRIEF DESCRIPTION OF THE DRAWINGS

Preferred embodiments of the present invention will now be described, by way of example only, with reference to the accompanying drawings. It will be understood that the particularity of the drawings is not intended to supersede the generality of the preceding description of the present invention. In the drawings, like reference characters designate like features, and.

DETAILED DESCRIPTION OF THE PREFERRED EMBODIMENTS

Referring to FIGS. 1-4, a manually actuated gas control valve 1 includes a valve body 2 and a valve control element 3, the valve control element 3 being movably mounted within the valve body 2.

The valve body 2 has a gas inlet 4, a gas outlet 5, and a gas passage 6 that connects the inlet 4 with the outlet 5.

The valve control element 3 includes a valve stem 7 and a valve head 8. The valve head 8 includes a resilient O-ring seal 9 that seals against the inner wall of an inlet portion 10 of the gas passage 6 when the valve 1 is closed.

The valve element 3 also includes a secondary or bypass gas passage 11 for simmer control, which communicates between a gas inlet 12 at the head end of the valve element 3, and a gas outlet 13 in a side portion of the valve element 3.

The valve 1 is mounted within a gas appliance through bolt holes 14 in flange portions 15 of the valve body 2. When installed, the gas inlet 4 will connect with a gas supply manifold, and the gas outlet 5 will connect with a gas burner of the appliance, e.g. a burner on a gas hob/cooker-top. These connections may take any standard form as would be understood by a person skilled in the art, and may use suitable O-ring seals, clamps and the like. For example, an O-ring may be provided about the outer periphery of the protruding portion of the gas passage inlet portion 10, as shown in phantom in FIGS. 3 and 4.

Also, a control knob 16 (shown in outline in FIGS. 3 and 4) will be fitted to the free end of the valve stem 7 so as to allow the valve stem 7 to be manually pushed inwardly and turned so as to open and close the valve 1.

Figure 1:
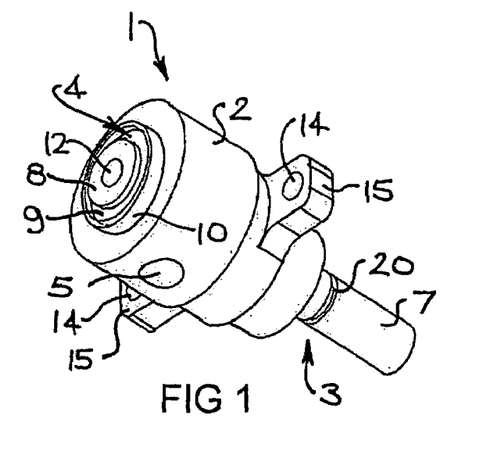
FIG. 1 is a perspective view of a control valve in accordance with one embodiment of the present invention.
Figure 2:
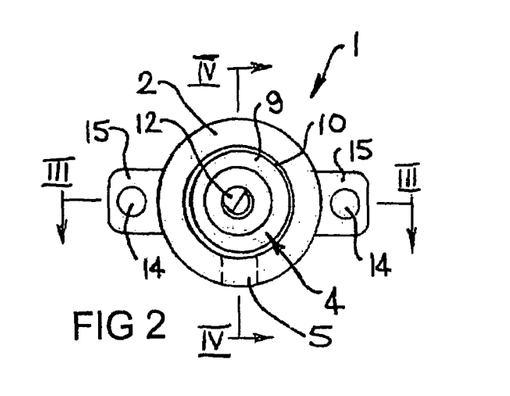
FIG. 2 is an inlet end view of A valve according to FIG. 1.
Figure 3:
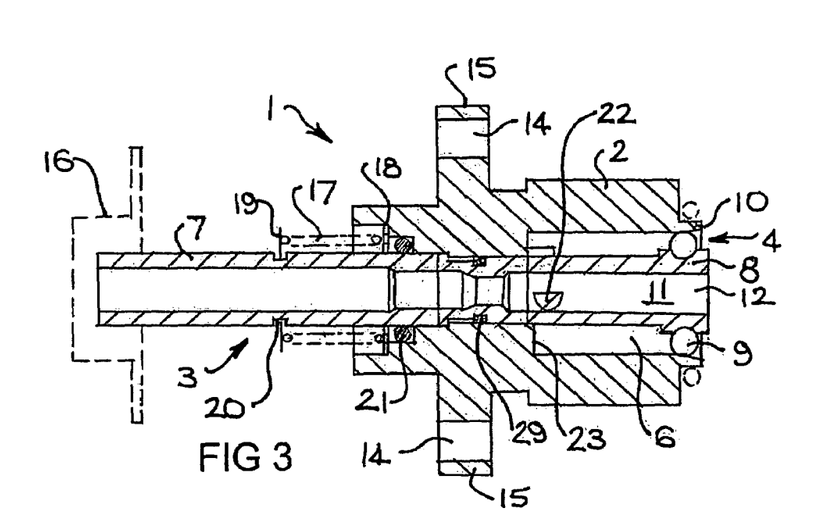
FIG. 3 is a cross-sectional view along line III-III of FIG. 2.
Figure 4:
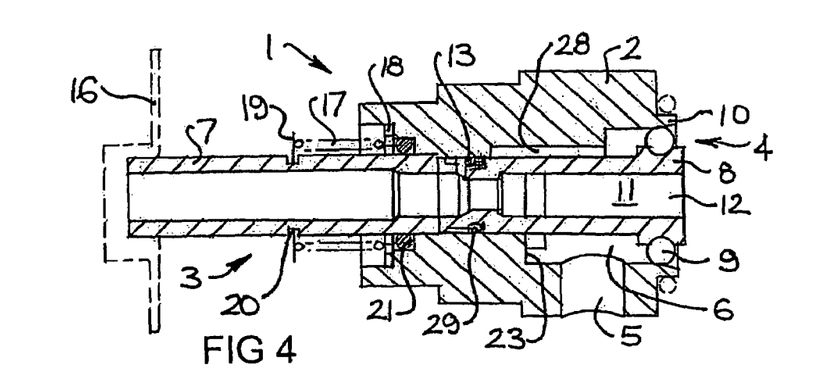
FIG. 4 is a cross-sectional view along line IV-IV of FIG. 2.

Referring to FIGS. 3 and 4, the valve element 3 is biased into its closed position (to the left in the drawings) by a spring 17 mounted between a metal washer 18 within the valve body 2 and a metal clip 19 located in a groove 20 on the valve stem 7. The metal washer 18 also holds an O-ring seal 21 in place in the valve body 2 so as to provide a seal about the valve stem 7.

The valve 1 may be placed either into a simmer position in which the main gas inlet 3 and outlet 4 communicate with one another via the simmer passage 11, or into a main burn/full flame position in which the O-ring seal 9 allows gas flow about the valve head 8 and through the main passage 6.

The movement of the valve element 3 is controlled by a user's actuation of the control knob 16 and by a projection or pin 22 that extends laterally from the valve stem 7 and acts as a cam follower by moving over a cam surface 23 that is provided on the valve body 2 at the inner end of the gas passage 6. The cam surface 23 is in a plane transverse to the longitudinal axis of the elongate valve control key 3, and the interaction of the cam follower pin 22 with the cam surface 23 causes axial or longitudinal displacement of the valve control key. That displacement in turn moves the head 8 and O-ring 9 at the end of the stem 7 in and out of sealing engagement with inner wall 10 of the valve body 2.

Figure 5:
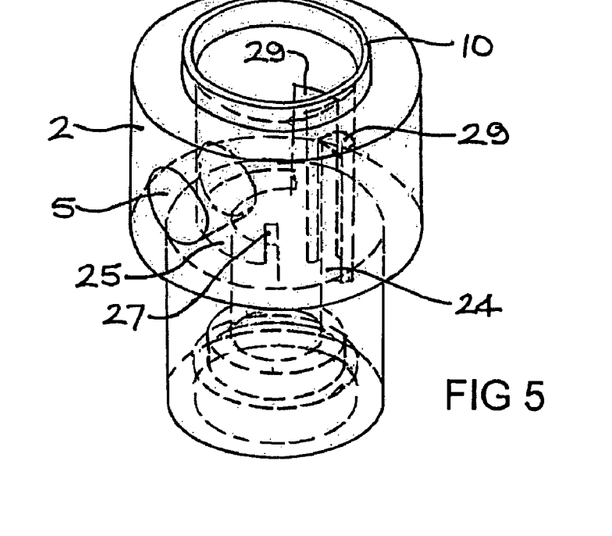
FIG. 5 is a perspective view of the valve body of FIG. 1.
Figure 6:
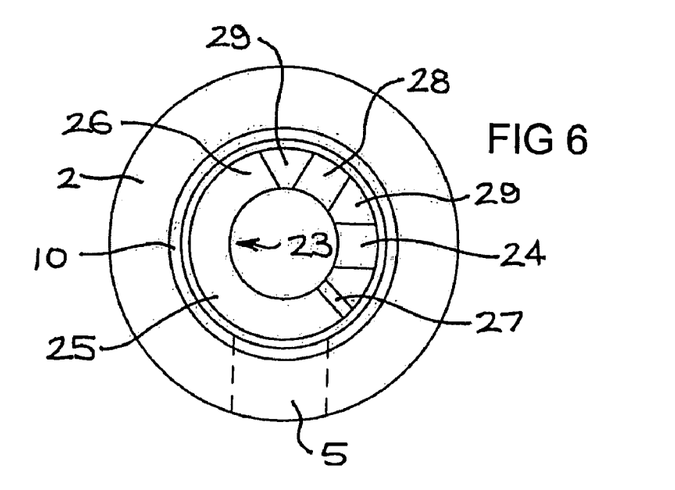
FIG. 6 is an inlet end view of the valve body of FIG. 5.

As seen best in FIGS. 5 and 6, the cam surface 23 generally comprises an "off" recess 24, a main ramp portion 25 for providing a full burn, a simmer portion 26 at the lower end of the ramp portion 25, and a stop 27 at the upper end of the ramp portion 25.

In the "off" position, the pin 22 lies in the "off" recess 24, and prevents any rotation of the valve stem 7. This helps to prevent accidental opening of the valve 1.

In order to open the valve 1, either to the simmer or full burn position, the valve stem 7 must firstly be pushed inwardly in order to raise the pin 22 out of the "off" recess 24 and also over the stop 27. The valve stem 7 can then be rotated anti-clockwise (form the user's viewpoint), so that the pin 22 lies above the ramp portion 25 of the cam surface 23. When released, the pin 22 will lie on the ramp portion 25, and will be held against it by the bias of the stem spring 17.

Further rotation of the valve stem 7, without any inward pushing of the stem 7, then serves to control the opening of the valve 1 by moving the pin 22 along the cam surface 23.

Thus, for a simmer control, the stem 7 is rotated until the pin 22 lies at the lower end of the ramp portion 25. In this position, the stem 7 is not drawn sufficiently within the valve body 2 so as to move the seal 9 off of the inner portion 10 of the gas passage 6, and so the main flow of gas is stopped. However, referring to FIG. 4, when the pin 22 lies at the lower end of the ramp portion 25, the bypass gas outlet 13 of the valve element 3 is moved sufficiently from the closed position shown in FIG. 4 so that it takes up a position over a gas channel 28 that is formed between a pair of longitudinally extending ribs 29 on the inner wall of the gas passage 6. This allows a constant low flow of gas from the valve element inlet 12 through the passage 11, out of the outlet 13, along the gas channel 28, into the gas passage 6 and out of the main gas outlet 5 to the associated burner. This then provides the simmer control.

It should be noted that when the valve element 3 is in its dosed (home) position, with the pin 22 in the off-recess 24, an O-ring 29 prevents gas leakage between the stem outlet 13 and main gas passage 6. Also, rotation of the pin 22 beyond the simmer control position 26 is prevented by one of the ribs 29 of the simmer gas channel 28.

In order to provide a full flow of gas, the stem 7 is rotated so that the pin 22 moves from the simmer position 26 along the ramp 25 to the stop 27. As the pin 22 moves along the ramp portion 25, the stem 7 is drawn into the valve body 2, and the seal 9 is moved off of the inner portion 10 of the gas passage 8, so as to allow a full flow of gas about the valve head 8.

It should be noted that the inlet end portion 10 of the gas passage 6 is tapered slightly, so as to guide the O-ring 9 back into the passage 6 on closure of the valve head 8.

In order to turn the gas flow off, the valve stem 7 should again be depressed and then rotated clockwise (from the user's viewpoint). This allows the pin 22 to pass over the stop 27, and lie above the off-recess 24. Release of the stem 7, then causes the pin 22 to lie within the off-recess 24, under the influence of the bias spring 17. Over-rotation of the stem 7 in the clockwise direction is prevented by the pin 22 abutting the other one of the simmer gas channel ribs 29.

As a further safety feature, the valve control element 3 may have a projection or the like on its right-hand end (when viewed in FIG. 3). e.g. as a part of the clip 19, that engages with a raised portion of the left-hand end of the valve body so as to limit the longitudinal movement of the valve control element 3 and so prevent opening of the main O-ring seal 9, when the valve control element is in the "off" position. This can then prevent accidental opening of the valve 1 through inadvertent pressure on the control knob 16 when the knob 16 is in the closed position. The projection and raised portion should disengage when the valve control element is over the ramp portion 25, so as to then allow opening of the valve. This safety feature could also be provided by having a suitable projection within the gas passage 6 (above the cam surface 23) e.g. in the region of the "off" recess 24, which similarly limits movement of the valve stem 7 and prevents opening of the valve in the "off" position merely through depression of the valve control element 3.

A further feature of the valve 1 is that once the valve control element 3 has been partially pushed inwardly and rotated away from the "off" position, it may be pushed fully inwardly by a user to open the main seal 9 wherever the pin 22 is above the cam surface 23. Thus, the user can push the valve control element 3 fully into the valve body 2 to fully open the valve 1 whilst the pin 22 is in the simmer position 26, and then remove pressure on the control knob 16 to allow the pin 22 to rest on the simmer position 26. This then allows the user to produce a full flame for igniting the gas and then immediately bring the gas to a simmer flow. This contrasts with the prior art, where the gas is initially lit with the plug in the full flame position, and the valve must then be turned through the furl flame positions in order to reach the simmer position. The present valve can therefore provide an easy start simmer control.

Figure 7:
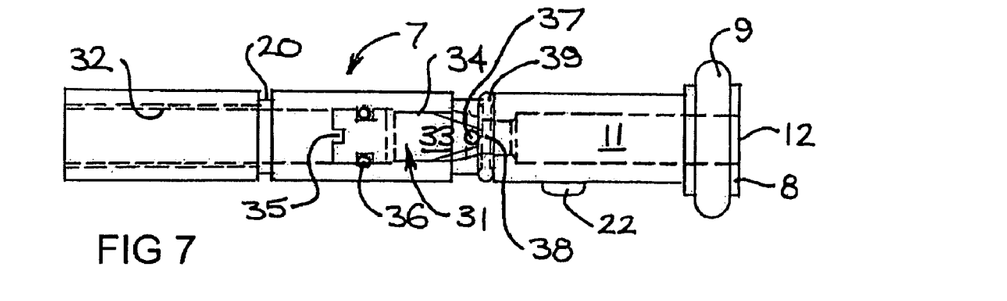
FIG. 7 is a side view of the valve element of a valve according to FIG. 1.
Figure 8:
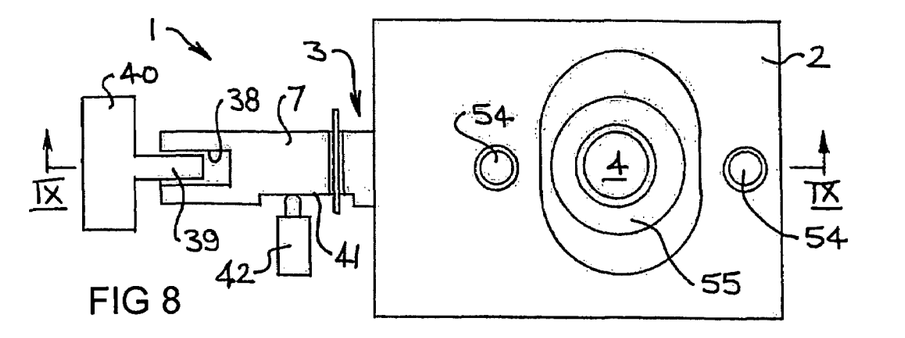
FIG. 8 is top view of a valve according to a second embodiment of the present invention.

FIG. 7 shows the valve element 3 by itself in this drawing, a simmer adjustment plug 31 is also shown. This plug 31 is used to control the amount of gas flow at simmer.

The plug 31 is mounted within a passage 32 running through the valve stem 7, which is a continuation of the simmer gas passage 11. The plug 31 comprises a body portion 33 with a screw thread 34 about its outer periphery, that engages with a screw thread in the mounting passage 32. It also comprises a slot 35 for receiving the end of a screwdriver or similar tool, and an O-ring 36 for sealing the mounting passage 32 from the simmer gas passage 11.

The body portion 33 may be hollow, and may include an opening 37 on its periphery that lies in use adjacent the valve element outlet 13, and an opening in its end 38 that communicates with the simmer gas passage 11. Rotation of the plug adjuster 31 by a suitable tool can then cause the opening 37 to overlap the valve element outlet 13 by a greater or lesser amount, and so controls the amount of gas flow at simmer. Alternatively, the plug 31 need not have the openings 37 and 38, and instead could provide a needle vale action.

Generally, the adjustment plug 31 will be set only once, on installation of the valve 1. It allows the same valve to be used with different types of fuel gas, e.g. natural gas or LPG. Thus, LPG requires a smaller gas orifice at simmer than does, natural gas.

The control valve 1 discussed above, which is controlled using a cam surface and cam follower pin, and is sealed with brings, is able to use fewer parts than standard gas cocks, and can also be simpler to manufacture. For example the standard gas cocks require a high degree of tolerance between their valve body and plug, which is hard to achieve and generally requires a lapping procedure of the two parts and the injection of special sealing lubricants. Such procedures are not required with the present gas valve.

A second embodiment of the present invention will now be described with reference to FIGS. 8 to 11, in which like parts to the previous embodiment are given the same reference numerals.

This embodiment also comprises a valve body 2, valve control element/key 3, follower pin 22 and cam surface 23. In this embodiment, however, the gas inlet 4 is provided in the side of the valve body and the outlet 5 is at the and of the valve body. In this embodiment also, the valve 1 is configured for electronic control rather than manual control, and rather than have a control knob 16, the valve stem 7 includes a slot 38 for receiving the rotor 39 of an electric motor 40. It also includes a notch 41 for engagement by a micro-switch 42 to determine when the valve 1 is in the "off" position. The motor 40 may be for example a stepper motor or servo motor.

The motor 40 and micro-switch 41 may be connected to a control system that actuates the valve 1 through the motor 40 and monitors the position of the valve 1 through both the motor signals and the activation or not of the micro-switch 42.

As the valve 1 is electronically controlled, and will be mounted within the associated gas appliance, it will be out of reach of the users of the appliance, and so no safety precautions are required in order to prevent accidental opening. Thus, there is no need to require depression of the valve stem 7 before it can be rotated. Instead, operation of the valve 1 is purely through rotation of the valve element 3 by the attached motor 40.

Figure 9:
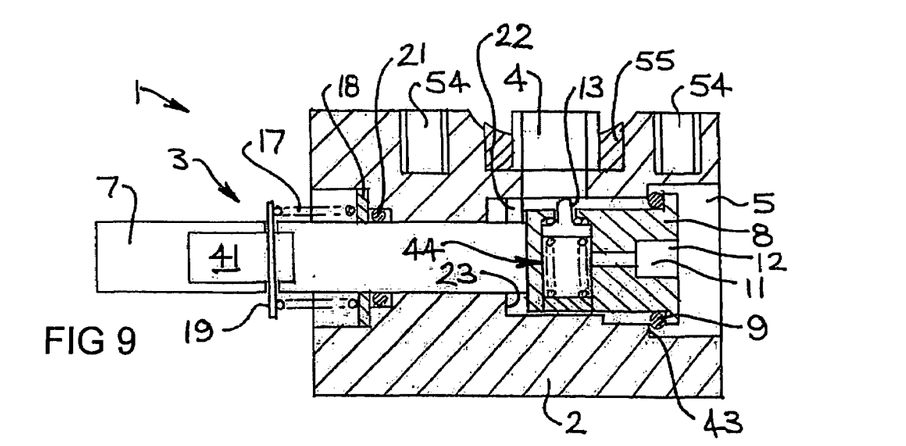
FIG. 9 is a cross-sectional view along line IX-IX of FIG. 8.

In this embodiment, the O-ring 9 seats with a valve seat 43 located on a stepped portion of the gas passage 6, and the simmer control takes on a different form.

This simmer control is still provided through a gas passage 11 of the valve element 3 that connects an end inlet 12 of the valve element with a side outlet 13. In this case, however, the side outlet 13 is opened or closed by a simmer valve assembly 44 that is activated through rotational movement of the valve element 3 (rather than through the longitudinal movement of the simmer control of the previous embodiment).

Figure 11:
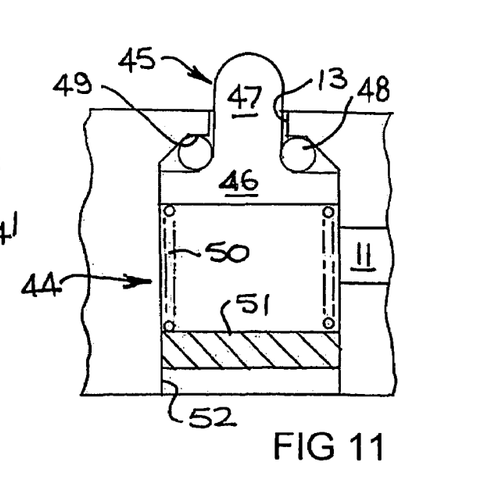
FIG. 11 is an enlarged view of the simmer control of FIG. 9.

Simmer valve assembly 44, seen in enlarged form in FIG. 11, comprises an actuating member 45 having a base portion 46 and a projection 47 that extends out of the side opening 13 of the valve element 3. An O-ring seal 48 is mounted on the base portion 46 about the projection 47.

The O-ring 48 seals against a valve seat 49 about the inner periphery of the outlet 13, and is biased into the closed position by a spring 50 mounted between the base portion 46 of the actuating member 44 and a retaining disc 51 that is glued into place in the end of a recess 52 within which the simmer valve assembly 44 is housed.

When in the closed position, the main O-ring 9 seals against the valve seat 43, and the simmer O-ring 48 seals against the valve seat 49, with the projection 47 extending into the valve inlet 4. Thus, no gas flows.

As the valve element 3 is rotated through 90 degrees, the follower pin 22 does not engage the ramp portion 25 of the camming surface 23, and so the valve element 3 is not drawn into the valve body 2, and the main O-ring 9 is not moved from the valve seat 43. However, the projection 47 of the simmer actuating member 45 contacts the inner wall of the gas passage 6, and is moved inwardly so as to open the simmer valve assembly 44 and allow a flow of gas through the simmer passage 11 from the inlet 4 to the outlet 5. This provides the simmer control.

It should be noted that the base portion 46 of the actuating member 45 allows for gas flow across it, e.g. by having a plurality of holes therein or by comprising a set of radial arms between which gas may flow.

Figure 10:
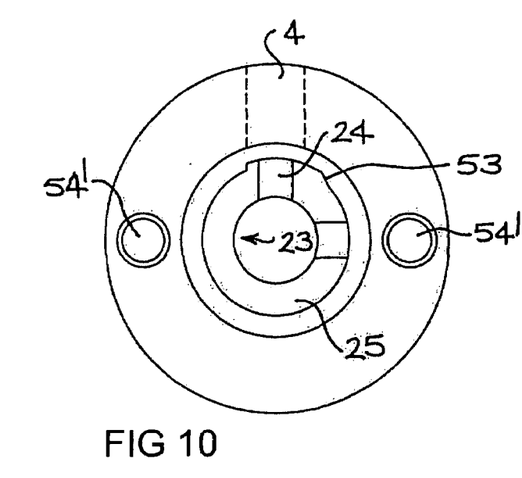
FIG. 10 is an inlet end view of a valve according to FIG. 9.

Also, as best seen in FIG. 10, an edge of the inlet 4 has a sloped portion 53 with which the projection 47 engages as the valve element 3 is turned to the 90 degree position. This helps to move the projection 47 inwardly and to prevent the projection 47 from catching against the side of the inlet 4.

As the valve element 2 is rotated beyond the 90 degree position, the cam follower pin 22 engages with the ramped portion 25 of the camming surface 23, and as the pin 22 moves along the ramped portion 25, the valve element 2 is drawn into the valve body 2 and the main O-ring 9 is moved off the valve seat 43 thereby allowing gas to flow from the inlet 4 through the gas passage 6 past the valve head 8 and out of the outlet 5. The further the pin 22 is moved along the camming surface 23, the further the head 8 is moved away from the seat 43, and thus the greater the gas flow.

It should be noted that the connection of the electric motor rotor 39 within the slot 38 allows the valve stem 7 to be drawn into the valve body 2 whilst still retaining engagement with a portion of the rotor 39.

To close the valve 1, the valve element 3 may be rotated so that the projection 47 once again extends into the outlet 5, and so that the pin 22 is no longer on the ramped portion 25 of the camming surface 23. This may be achieved either by continuing to rotate the stem 7 in the same opening direction by a few further degrees or by reversing the direction through a full 360 degrees.

The valve 1 includes screw holes 54 as well as a suitable seal member 55 in a curved recess for mounting the inlet 4 of the valve 1 adjacent a tubular gas rail or manifold in an associated appliance as is known in the art. As can be seen in FIG. 10, screw holes 54' are also provided at the outlet end of the valve for securely attaching a burner tube (not shown) for conveying the gas from the outlet 5 to a gas burner of the appliance.

This second embodiment has similar advantages over the standard prior plug valves as does the first embodiment. Also, them is reduced wear on the O-ring 48 of the simmer valve assembly 41, as opposed to the wear on the O-ring 21 of the first embodiment, and the seal provided by the main O-ring 9 is retained as the part wears. Thus, as the O-ring 9 wears, the valve element 3 merely sits lower in the valve body 2, with the O-ring remaining firmly seated on the valve seat 43.

Importantly for an electronic system, there is little friction or sticking between the valve element 3 and valve body 2, and so a small, compact, low powered and low-torque electric motor 40 may be used rather than a much larger motor and gear chain that might be eyed to be required for the standard plug/cock valve design.

Figure 12:
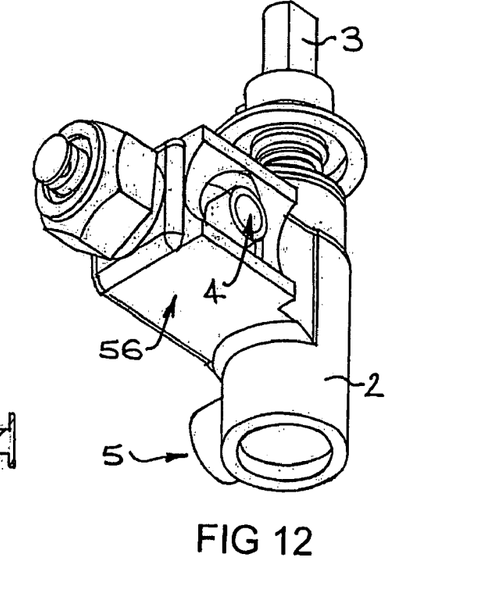
FIG. 12 is a perspective view of a control valve in accordance with a third embodiment of the present invention.
Figure 13:
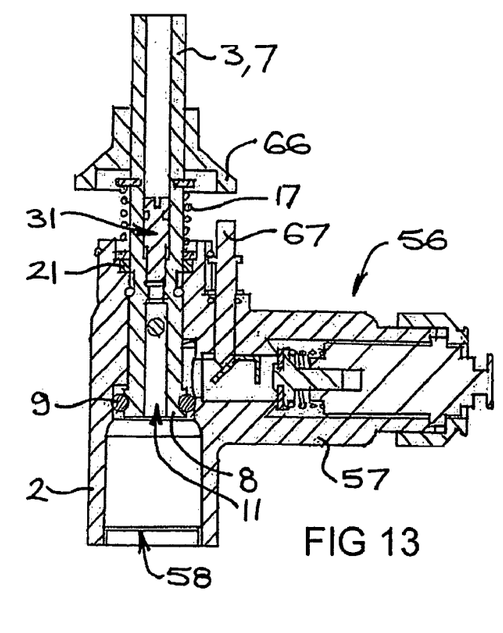
FIG. 13 is a full side cross-sectional view of the valve in FIG. 12.

With reference now to FIGS. 12 and 13 of the drawings, a third embodiment of the gas control valve according to the invention is illustrated. This third embodiment of the control valve 1 is very similar to the first embodiment (FIGS. 1 to 7) in terms of the configuration of the valve control element/key 3 having valve stem 7, valve head 8 and resilient O-ring seal 9, as well as the cam mechanism comprising cam follower pin 22 projecting from the valve stern 7 and the cam surface 23 inside the valve body 2, and the simmer control device 31 within the valve stem 7. In this third embodiment, however, the valve body 2 incorporates a "flame-failure" safety valve mechanism 56 in a side extension casing 57. The structure and operation of this "flame-failure" safety valve is described in detail in the Applicant's earlier International Patent Application PCT/AU00/00949 (published as WO 01/11278), the entire contents of which are incorporated herein by reference. Accordingly, that structure and operation will not be described here at length.

In this third embodiment of the control valve 1, the gas inlet 4 into the valve body 2 is provided in the flame-failure side extension casing 57 such that the control valve 1 is adapted to be mounted adjacent a tubular gas supply manifold or rail. The direction of gas flow through the gas passage 6 and past the valve head 8 and O-ring seal 9 in this third embodiment is reversed compared with the first embodiment shown in FIGS. 1 to 7. The gas outlet 5 is again provided through an orifice at a side of the valve body 2, and the end of the valve body is sealed with a gas-tight plug or closure 58.

Figure 14:
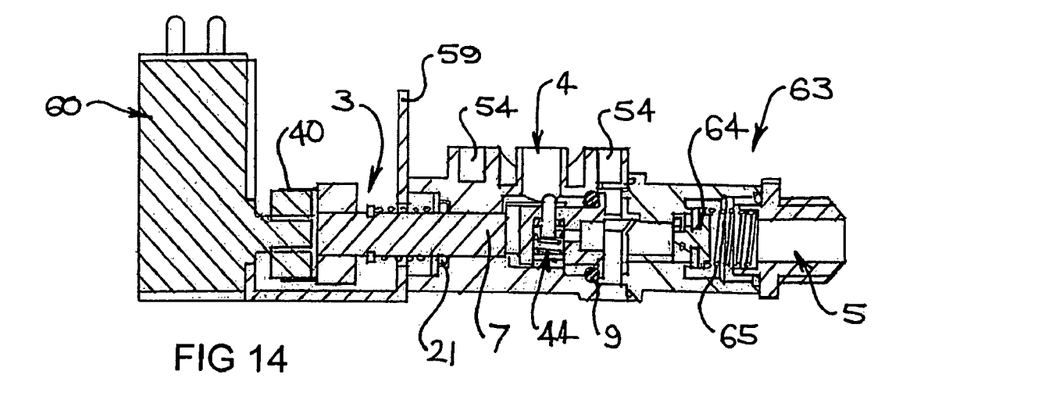
FIG. 14 is a full side cross-sectional view of a control valve according to a fourth embodiment of the present invention.

FIG. 14 of the drawings illustrates a fourth embodiment of the invention, which is a variation on the electronic control valve described with reference to FIGS. 8 to 11 of the drawings. In particular, the basic valve structure and operation including the valve body 2, control element 3, gas inlet 4, cam follower pin 22, cam surface 23, O-ring seal 9, valve seat 43 and simmer valve assembly 44 are all substantially identical to the configuration in the second embodiment. Among its differences, the control valve 1 of this fourth embodiment includes a bracket or mounting 59 provided for the electric motor 40 and its power supply and electronic control 60.

Furthermore, this fourth embodiment includes a secondary safety valve assembly 62 connected at the outlet end of the valve body 2. This safety valve assembly 62 includes a casing 63 housing a gas shut-off disc 64 biased by a spring 65 into sealing engagement with the casing 63 to form a secondary seal, additional to the O-ring 9 when the cam follower pin 22 is in the "off" recess. When the motor 40 is activated to turn the control key 3 and move the O-ring seal 9 off the valve seat 43 to permit gas flow through the gas passage 6, the longitudinal or axial displacement of the stem 7 causes a corresponding displacement of the shut-off disc 64, enabling the gas to flow through the secondary shutoff valve to the ultimate valve outlet 5. The valve outlet 5 in this fourth embodiment has a threaded outer surface for connection of a gas tube leading to an associated gas burner. The shutoff valve assembly 62 provides a secondary safety mechanism against the possibility of any gas leakage occurring due to wearing of the O-ring seal 9.

Figure 15:
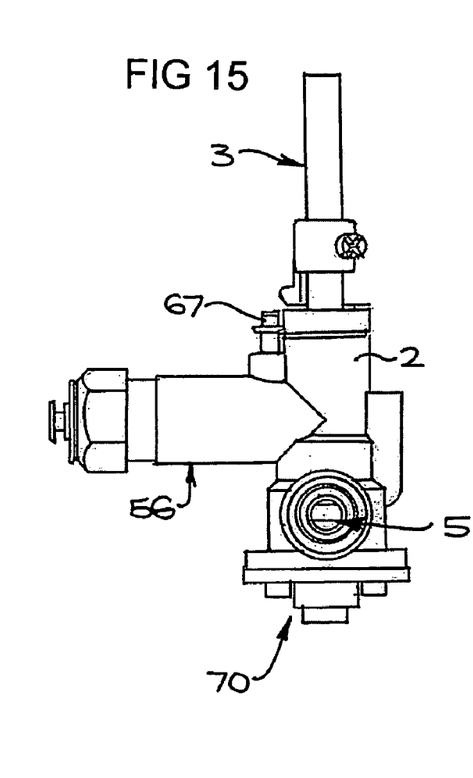
FIG. 15 is a cross-sectional view along line IV-IV of FIG. 2.
Figures 16, 17:
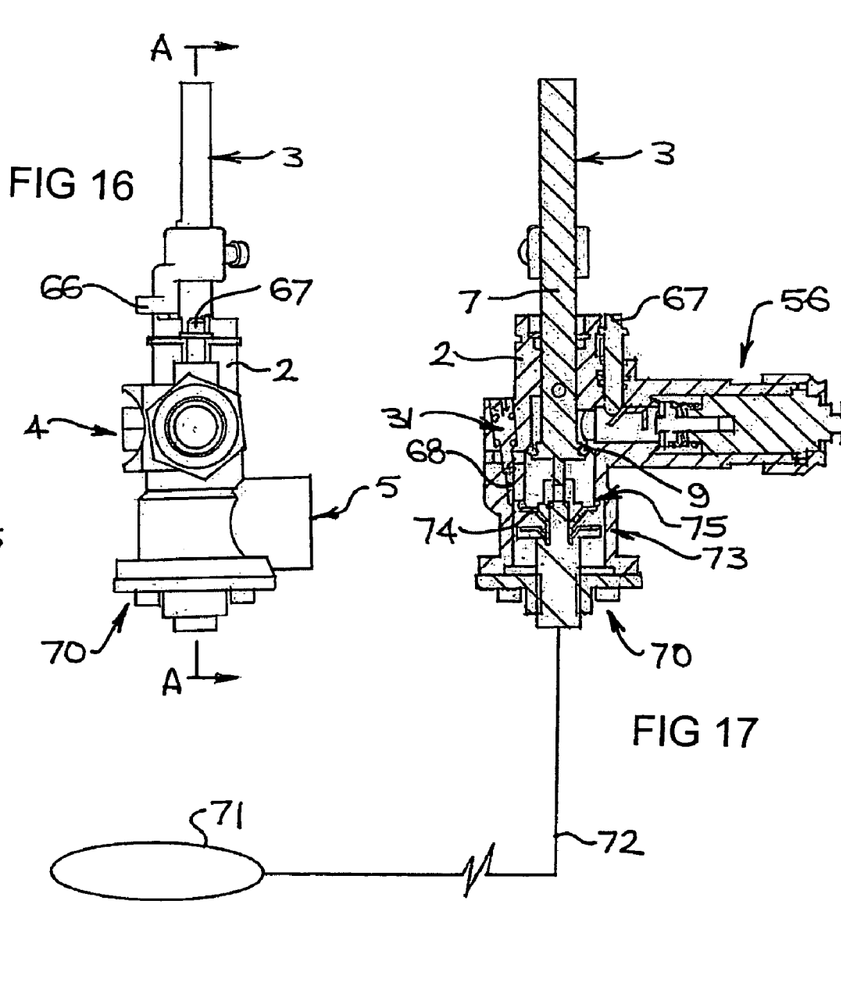
FIG. 16 is another side view of the valve body of FIG. 15.
FIG. 17 is a hill side cross-sectional view in the direction of the arrows A-A in FIG. 16.

Referring now to FIGS. 15 to 17 of the drawings, a fifth embodiment of the gas control valve according to the invention is illustrated. In the fifth embodiment, the gas control valve is or incorporates a thermostat, such as would be suitable for use in regulating the operating temperature of a gas oven. The configuration of the valve is very similar to that shown in the third embodiment of FIGS. 12 and 13. That is, it includes a "frame-failure" safety valve mechanism 56 mounted in a side extension casing 57 of the valve body 2.

Initial rotation of the control key 3 moves a pressing member 66 into alignment with the actuating shaft 67 of the safety valve 56.

As the control key is pressed inwards in this position, the press member 66 engages and depresses the actuating shaft 67 to open the safety valve (as is described in detail in WO-01/112781) to thereby allow gas flow into the gas passage 6. At the same time, the cam follower pin 22 is moved out of the "off" recess 24 and onto the ramped portion 25 whereby further rotation of the control key causes travel of the follower pin along the ramped portion of the cam surface 23 to axially displace the valve head 8 and O-ring seal 9 such that it moves off its seated position against the internal wall of the valve body 2. In so doing, a gas flow through a bypass or simmer passage 68 to the outlet 5 of the gas valve is obtained. At this initial simmer position, typically just enough gas flows to achieve a burner flame of sufficient magnitude to obtain an oven cavity temperature of 1206C. The bypass or simmer passage 68 includes a simmer adjustment plug 31 which can be screwed in and out to adjust the flow-rate of gas through the bypass or simmer passage 68.

A thermostat assembly 70 is mounted at an end of the valve body 2 adjacent the outlet 5 of this control valve 1. The thermostat assembly 70 includes a thermostat bulb 71, which is located remote from the valve body, typically in the oven cavity being heated. The thermostat bulb 71 is in thermal communication via connecting line 72 with a plug and disc assembly 73 at the outlet end of the valve body 2. The plug and disc assembly 73 is commonly referred to as the thermostat 'bellows'. As the valve control element or key 3 is further rotated from the simmer position, a sealing disc member 74 of these 'bellows' is moved inwardly on a screw thread such that it is moved axially off its seat 75. This allows additional gas to flow past the disc member 74 to the valve outlet 5, and thus to the gas burner, thereby increasing the oven temperature.

As the oven temperature increases, the temperature of the bulb 71 in the oven cavity also increases and this temperature increase is communicated back along the thermal connecting line 72 to the plug and disc assembly 73. The increased temperature of the thermostat bellows causes the disc member 74 to move back towards its seated position to again restrict the gas flow to the burner. This in turn causes a drop in flame level and therefore a drop in the oven temperature. The drop in temperature is again communicated via the bulb 71 back to the bellows assembly, and the reduction in temperature causes the bellows arrangement to again allow increased gas flow. This operation of the thermostat enables the oven temperature to remain at an approximate value within predetermined limits defined by operating tolerances of the bellows.

It is to be understood that various modifications and/or alterations may be made to the above without departing from the spirit and scope of the invention as outlined herein.

For example, the camming surface 23 could take any other suitable form, and could comprise a number of stepped portions, as opposed to a gradually changing ramp. The valve element 3 could also include more than one cam follower, e.g. it could use a pair of opposed cam follower pins that run on identical cam surfaces that each extends only 180 degrees about the periphery of the gas passage.

It will be noted that the ramped portions 25 of the two embodiments are ramped in opposite directions, and any, suitable ramp direction may be used, as desired.

Also, the invention is applicable to applications that do not require simmer control, and need only the main control, in which case the bypass passage 11 and the like need not be provided.

The main control valve e.g. O-ring 9, may provide a simple on/off control, or could provide throttling control.

The gas flow through the valves 1 could be reversed so that the inlets and outlets swap roles, although preferably the valves open against gas pressure to provide a more positive seal on closure.

The embodiments could both be used in either manual or automatic controls, and actuators other than an electric motor could be used, e.g. some type of automatic control, such as a thermostat control or the like.

The valves may be used in isolation or with other valve controls, such as a safety cut-out valve for when the gas burner goes out, and/or a thermal control valve such as a thermostat.

The valves of the present invention have application in ovens, cookers, cooker-tops, hobs, stoves, barbeques, heaters, dryers, water healers and the like.

The valves may be made from any suitable materials, and in any suitable sizes.

What is claimed is:

1. An electronic gas control valve including:
   an electric motor for operating said valve;
   a valve body having a gas inlet, a gas outlet, and a gas passage between said inlet and said outlet; and
   a valve control element for controlling the flow of gas between said inlet and said outlet;
   wherein said valve control element is mounted in said valve body for rotation therein by said electric motor, and said valve control element includes a cam follower that engages with a cam surface of the valve body, rotation of the valve control element by said electric motor causing the cam follower to co-operate with the cam surface to move the valve control element longitudinally within said valve body to open or close the valve under a camming action;
   wherein said valve includes a main sealing element operated by said valve control element to control a main flow of gas through said valve body, and wherein said valve includes a bypass passage and bypass valve operated by said valve control element to control a bypass flow of gas that bypasses said main sealing element; and
   wherein said main sealing element is operated by a longitudinal movement of said valve control element relative to said valve body through said camming action, and wherein said bypass valve is operated by a rotational movement of said valve control element relative to said valve body without said camming action.

2. A valve according to claim 1, wherein said main sealing element includes an O-ring sealing element mounted on said valve control element.

3. A valve according to claim 1, wherein said bypass passage provides a simmer control.

4. A valve according to claim 1, wherein the bypass gas passage extends between openings in an end portion and a side portion of the valve control element.

5. A valve according to claim 4, wherein a gas channel is provided within the gas passage of the valve body, the valve control element being movable so as to overlap a side opening of the bypass passage with the gas channel to allow gas flow therebetween.

6. A valve according to claim 1, wherein said bypass valve includes an actuator portion that engages with an inner surface of the gas passage of the Valve body to open the bypass passage.

7. A valve according to claim 1, wherein said main sealing element includes a closure portion of said valve control element that seals against an inner surface portion of the valve body gas passage in the valve-closed position.

8. A valve according to claim 1, wherein said main sealing element includes a closure portion of said valve control element that seals against a valve seat of the valve body in the valve-closed position.

9. A valve according to claim 1, wherein the valve control element is spring-biased to urge the cam follower against the cam surface.

10. A valve according to claim 1, wherein the valve is a control valve for a gas burner.

11. An automatic gas valve, wherein the valve includes a valve body having a gas inlet, a gas outlet, and a gas passage between the inlet and outlet, and includes a valve control element for controlling the flow of gas between the inlet and outlet, wherein the valve control element is controlled by an automatic actuator and includes a cam follower that engages with a cam surface of the valve body, rotation of the valve control element causing the cam follower to co-operate with the cam surface to position the valve control element to control the flow of gas through the valve, and wherein the valve control element is rotatable to a simmer position to provide a simmer flow of gas without longitudinal movement of said valve control element and is further rotatable to provide control of a main flow of gas through longitudinal movement of said valve control element.

12. An electronic gas valve including a valve body having a gas inlet, a gas outlet, and a gas passage between the inlet and outlet, and including a valve control element for controlling the flow of gas between the inlet and outlet, wherein the valve control element is controlled by an electric motor and includes a cam follower that engages with a cam surface of the valve body, rotation of the valve control element causing the cam follower to co-operate with the cam surface to position the valve control element to control the flow of gas through the valve, and wherein the valve control element is rotatable to a simmer position to provide a simmer flow of gas without longitudinal movement of said valve control element and is further rotatable to provide control of a main flow of gas through longitudinal movement of said valve control element.

13. A gas valve including a valve body having a gas inlet, a gas outlet and a main gas passage therebetween, and a valve control element mounted in said valve body, a main valve operable by said valve control element for opening and closing said main gas passage, and a bypass valve operable by said valve control element for providing a bypass flow of gas about said main valve, said gas valve including a main cam follower and a main cam surface over which the main cam follower may be moved in use, and a bypass cam follower and a bypass cam surface over which the bypass cam follower may be moved in use, said main cam surface being provided in a plane perpendicular to a longitudinal axis of said main gas passage and said bypass cam surface being provided as a cylindrical wall portion about said longitudinal axis, rotational movement of said valve control element through a first angular range causing said bypass cam follower to move over said bypass cam surface and open said bypass valve, and rotational movement of said valve control element through a second angular range causing said main cam follower to move over the main cam surface to cause said valve control element to move longitudinally and to open said main gas valve.

14. A valve according to claim 1, wherein the valve incorporates a thermostat.

15. A gas appliance including a gas burner and a gas flow control, the gas flow control including a gas valve in accordance with claim 1.

16. A gas cooker including at least one gas valve according to claim 1, the gas valve controlling the supply of gas to one or more gas burners of the cooker.

17. An automatic gas appliance including a gas control valve according to claim 11.

18. An electronic gas appliance including a gas control valve according to claim 12.

19. A gas control valve including a valve body, a valve control element for controlling the flow of gas through said valve body, and an electric motor for rotating said valve control element, wherein said valve control element is moved longitudinally within said valve body under a camming action to open a main sealing element, and wherein said valve control element includes a bypass passage therein for bypassing said main sealing element, said bypass passage including a bypass valve therein for opening and closing said bypass passage, said bypass valve including an actuator element that engages with an inner surface of said valve body to open said bypass valve when said valve control element is rotated into a bypass position by said electric motor.

20. An electrically-actuated valve, said valve including a valve body having a gas inlet, a gas outlet and a gas passage therebetween, and a valve control element for opening or closing said gas passage, said valve control element being mounted in said valve body for rotation by an electric motor and including a cam follower thereon that engages with a cam surface of said valve body, said cam surface including a ramped portion for urging said valve control element to move longitudinally within said valve body to open a main sealing element, and said cam surface including a generally flat portion for allowing said valve control element to be rotated to a bypass position at which a bypass valve is actuated to open a bypass gas passage in said valve control element, said bypass gas passage providing a gas flow that bypasses said main sealing element.

21. A valve according to claim 1, wherein said valve includes a second main sealing element, and wherein rotation of said valve control element to open said first main sealing element also opens said second main sealing element.

22. A valve according to claim 21, wherein said second main sealing element is provided in a gas passage facing said first main sealing element.

23. An electronically controllable gas burner including an electrically-actuated gas control valve, said valve including a valve body having a gas inlet, a gas outlet and a gas passage therebetween, and a valve control element mounted in said valve body for rotation by an electric motor for controlling the flow of gas through the control valve to control a flame of the gas burner, wherein said valve control element is rotatable so as to move longitudinally under a camming action to open a main flow control sealing element for controlling a main flow of gas to provide control of said flame between low and high flames, and wherein said valve control element is rotatable without said longitudinal movement so as to provide a bypass flow of gas through said valve to provide a simmer flame.

24. The gas burner of claim 23, wherein said main flow control sealing element includes an O-ring seal that seals against a valve seat.

25. The gas burner of claim 23, including a second main sealing element also actuated by the valve control element, said second main sealing element being provided in a gas passage facing said main flow control sealing element.

* * * * *